(12) United States Patent
Kuwamura (10) Patent No.: US 11,014,246 B2
(45) Date of Patent: May 25, 2021

(54) CONTROL DEVICE, ROBOT, CONTROL METHOD, CONTROL PROGRAM, AND STORAGE MEDIUM

(71) Applicant: SHARP KABUSHIKI KAISHA, Sakai (JP)

(72) Inventor: Kaiko Kuwamura, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 266 days.

(21) Appl. No.: 16/158,314

(22) Filed: Oct. 12, 2018

(65) Prior Publication Data

US 2019/0111567 A1 Apr. 18, 2019

(30) Foreign Application Priority Data

Oct. 13, 2017 (JP) .............................. JP2017-199619

(51) Int. Cl.

| | |
|---|---|
| *G10L 15/22* | (2006.01) |
| *B25J 11/00* | (2006.01) |
| *G06K 9/00* | (2006.01) |
| *G10L 15/26* | (2006.01) |
| *G10L 25/48* | (2013.01) |
| *B25J 13/00* | (2006.01) |

(52) U.S. Cl.
CPC ......... *B25J 11/0005* (2013.01); *B25J 13/003* (2013.01); *G06K 9/00288* (2013.01); *G06K 9/00335* (2013.01); *G10L 15/22* (2013.01); *G10L 15/26* (2013.01); *G10L 25/48* (2013.01)

(58) Field of Classification Search
CPC .... G10L 1/25; G09B 1/25; G06F 1/25; G06Q 1/25; H04B 1/25; H04N 1/25; H04M 1/25
See application file for complete search history.

(56) References Cited

U.S. PATENT DOCUMENTS

| | | | |
|---|---|---|---|
| 5,623,592 A * | 4/1997 | Carlson ..................... | G06F 8/34 715/866 |
| 6,070,139 A * | 5/2000 | Miyazawa ............ | G10L 15/065 704/270 |
| 2005/0219356 A1* | 10/2005 | Smith ................ | A47B 21/0073 348/14.05 |
| 2007/0192910 A1* | 8/2007 | Vu ........................ | G05D 1/0274 700/245 |
| 2011/0044501 A1* | 2/2011 | Tu ........................... | G06F 3/038 382/103 |

(Continued)

FOREIGN PATENT DOCUMENTS

| | | |
|---|---|---|
| JP | 2002-108388 A | 4/2002 |
| JP | 2011-061634 A | 3/2011 |

(Continued)

*Primary Examiner* — Neeraj Sharma
(74) *Attorney, Agent, or Firm* — ScienBiziP, P.C.

(57) ABSTRACT

An object of the present invention is to urge a user, in a manner easily recognizable to the user, to stop speaking. A control section obtains a voice. The control section includes: a concurrence determination section configured to determine, on the basis of the voice, whether or not concurrent occurrence of speech has taken place; and a driving control section configured to, in a case where the concurrent occurrence of speech has taken place, control a driving section of a robot so as to cause a movable part of the robot to make a deterrence motion.

6 Claims, 7 Drawing Sheets

(56) References Cited

U.S. PATENT DOCUMENTS

| | | | |
|---|---|---|---|
| 2011/0131041 A1* | 6/2011 | Cortez | G10L 15/16 |
| | | | 704/235 |
| 2011/0166856 A1* | 7/2011 | Lindahl | G10L 15/20 |
| | | | 704/233 |
| 2013/0151249 A1 | 6/2013 | Nakadai et al. | |
| 2013/0211826 A1* | 8/2013 | Mannby | H04M 3/42221 |
| | | | 704/201 |
| 2014/0139426 A1* | 5/2014 | Kryze | G06K 9/00892 |
| | | | 345/156 |
| 2017/0264653 A1* | 9/2017 | Banyai | G06F 9/453 |
| 2018/0233139 A1* | 8/2018 | Finkelstein | G01S 5/28 |
| 2018/0296291 A1* | 10/2018 | Vokrot | A61B 34/76 |

FOREIGN PATENT DOCUMENTS

| | | |
|---|---|---|
| JP | 2011-154099 A | 8/2011 |
| JP | 2013-119155 A | 6/2013 |
| JP | 2013-122695 A | 6/2013 |

\* cited by examiner

CONTROL DEVICE, ROBOT, CONTROL METHOD, CONTROL PROGRAM, AND STORAGE MEDIUM

This Nonprovisional application claims priority under 35 U.S.C. § 119 on Patent Application No. 2017-199619 filed in Japan on Oct. 13, 2017, the entire contents of which are hereby incorporated by reference.

TECHNICAL FIELD

The present invention relates to a control device and the like which control a robot including a movable section.

BACKGROUND ART

Conventionally, there has been known a device which adjusts timing of speech in conversations between a user and a machine such as a robot or between users. For example, Patent Literature 1 discloses a technology for detecting concurrent speech of users. Patent Literature 1 also discloses a technology in which in a case where concurrent speech of users takes place, a notification is outputted, via a screen display or a voice, to one of the users who started speaking after the other(s) did, the notification urging the user to stop speaking.

CITATION LIST

Patent Literature

[Patent Literature 1]
Japanese Patent Application Publication, Tokukai, No. 2011-61634 A (Publication Date: Mar. 24, 2011)

SUMMARY OF INVENTION

Technical Problem

However, it may not always be effective to urge a user to stop speaking by notifying the use via a screen display or a voice. For example, in a case where the user is not looking at a screen on which an image and characters are displayed, a notification for urging the user to stop taking will be overlooked. In another example, if the user is in a state where it is difficult for the user to hear a voice, a notification for urging the user to stop speaking will not be heard.

It is an object of one aspect of the present invention to urge a user, in a manner easily recognizable to the user, to stop speaking.

Solution to Problem

In order to attain the object, a control device in accordance with one aspect of the present invention is a control device for controlling a robot which includes at least one movable part driven by a driving section, the control device including: a voice obtaining section configured to obtain a voice around the robot; a concurrent speech determination section configured to determine, on the basis of the voice, whether or not concurrent occurrence of speech has taken place between the robot and a user or between a plurality of users; and a driving control section configured to, in a case where the concurrent speech determination section determines that the concurrent occurrence of speech has taken place, control the driving section so as to cause the at least one movable part of the robot to make a deterrence motion which is a motion for urging a user among the user or the plurality of users to stop speaking.

In order to attain the object, a control method in accordance with one aspect of the present invention is a control method to be carried out by a control device for controlling a robot which includes at least one movable part driven by a driving section, the control method including: a voice obtaining step of obtaining a voice around the robot; a concurrent speech determination step of determining, on the basis of the voice, whether or not concurrent occurrence of speech has taken place between the robot and a user or between a plurality of users; and a driving control step of, in a case where it was determined in the concurrent speech determination step that the concurrent occurrence of speech has taken place, controlling the driving section so as to cause the at least one movable part of the robot to make a deterrence motion which is a motion for urging a user among the user or the plurality of users to stop speaking.

Advantageous Effects of Invention

According to the one aspects of the present invention, it is possible to urge a user, in a manner easily recognizable to the user, to stop speaking.

DESCRIPTION OF EMBODIMENTS

The present invention is related to a technology for solving concurrent occurrence of speech in a case where the concurrent occurrence has taken place. Concurrent occurrence of speech means that a speech voice of a device (e.g., any one of robots 1 through 3 to be described later), which performs voice output, and a speech voice of a user overlap with each other, or that speech voices of a plurality of users overlap with each other. In other words, a state in which concurrent occurrence of speech is taking place is synonymous with a state in which a plurality of robots or a plurality of users are speaking. A control device in accordance with the present invention is a device for solving, by deterring one or more users from speaking, concurrent occurrence of speech which has taken place. The following description will discuss Embodiments 1 through 4, which are example embodiments of the present invention.

Embodiment 1

Figure 1:
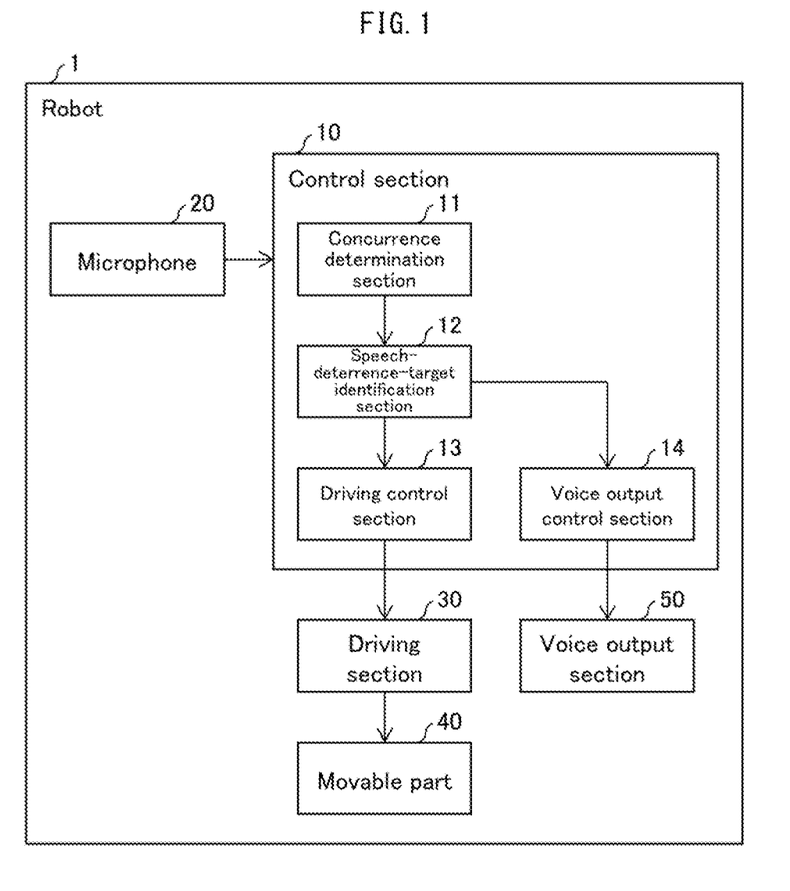
FIG. 1 is a block diagram illustrating a configuration of main parts of a robot in accordance with Embodiment 1 of the present invention.
Figure 2:
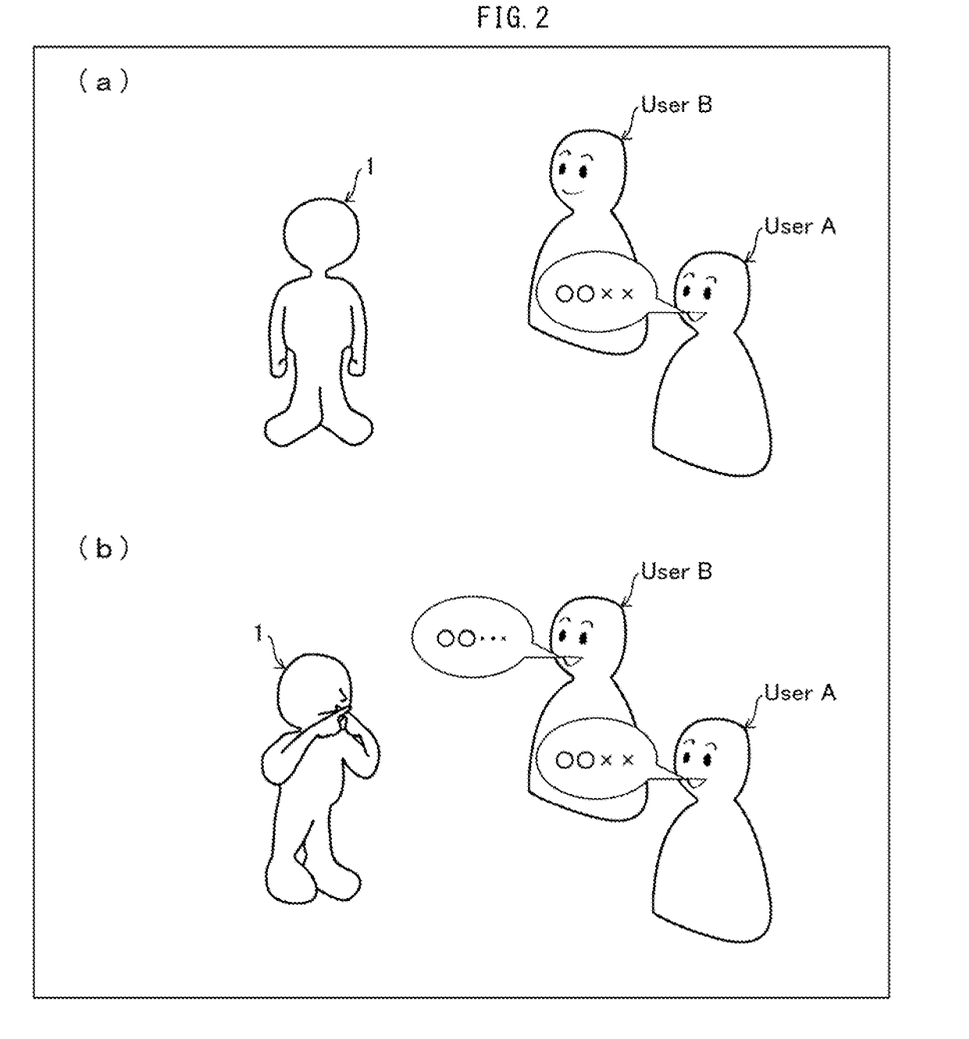
FIG. 2 is views schematically illustrating a motion of the robot.
Figure 3:
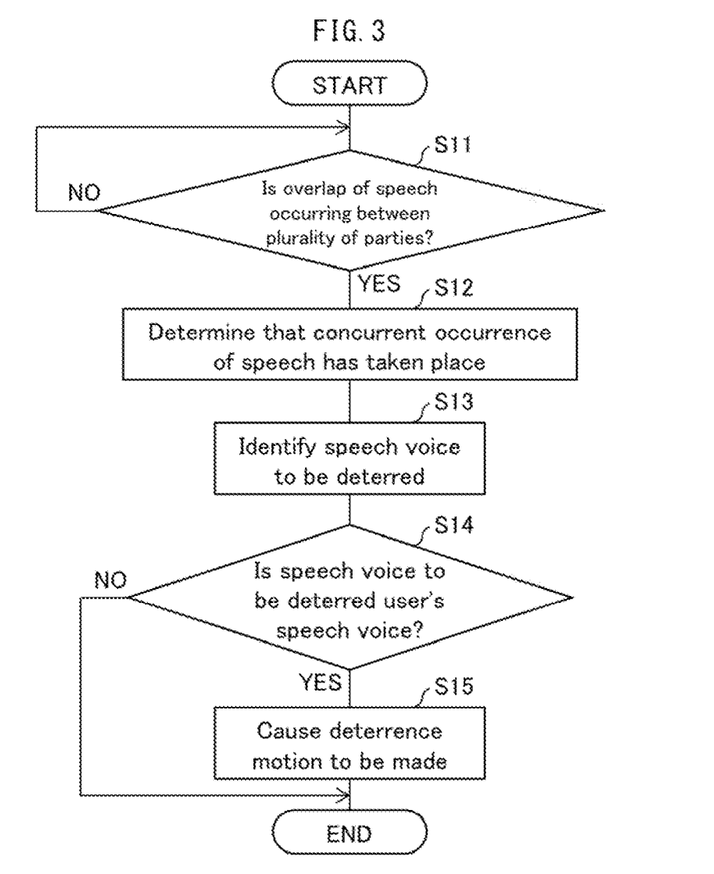
FIG. 3 is a flowchart showing a flow of processes carried out by a control section of the robot.

The following description will discuss Embodiment 1 of the present invention with reference to FIGS. 1 through 3.

(a) and (b) of FIG. 2 are views schematically illustrating a motion of a robot 1 in accordance with Embodiment 1. As illustrated in (a) of FIG. 2, in a case where a user (user B) starts speaking while another user (user A) is speaking, concurrent occurrence of the user A's speech and the user B's speech arises. The robot 1 monitors whether or not concurrent occurrence of speech, including one involving the robot 1's own speech, is taking place around the robot 1, by obtaining and analyzing voices around the robot 1. In a case where concurrent occurrence of speech takes place, the robot 1, as illustrated in (b) of FIG. 2, makes a motion (deterrence motion) for urging a user to stop speaking. Hereinafter, a voice inputted to the robot 1 means a voice around the robot 1, unless otherwise specified.

The deterrence motion is not limited to a specific type. The deterrence motion only needs to be a motion which can be expressed with use of a movable part of the robot 1 and can be understood by a user as meaning that the user should stop speaking. For example, in a case where the robot 1 is a human-like robot, the robot 1 may make, as the deterrence motion, a motion such as swinging the robot's arm, thrusting the robot's hand forward, putting the robot's index finger on the robot's lips, and the like.

<<Configuration of Main Parts of Robot 1>>

Next, the following description will discuss a configuration of the robot 1 for realizing the motion illustrated in FIG. 2. FIG. 1 is a block diagram illustrating a configuration of main parts of the robot 1. The robot 1 includes at least a control section (a control device, a voice obtaining section, and an image obtaining section) 10, a microphone 20, a driving section 30, a movable part 40 which is provided at one or more locations, and a voice output section 50.

The microphone 20 inputs voices around the robot 1 one by one to the control section 10. The microphone 20 starts this voice input at predetermined timing. The predetermined timing is, for example, timing at which the robot 1 is activated, timing at which an instruction to perform voice input is given from the control section 10, or the like. The voice output section 50 performs voice output under control of the control section 10. The voice output section 50 may be realized by a speaker or the like.

Under control of the control section 10, the driving section 30 causes the movable part 40 to move. The driving section 30 may be realized, for example, by a motor or the like. Under control of the control section 10, the voice output section 50 performs voice output or image output. The voice output section 50 may be realized, for example, by a speaker, a display, or the like. The movable part 40 is a part of the robot 1, and moves by being driven by the driving section 30. The movable part 40 may be any part as long as the movable part 40 is capable of expressing a deterrence motion. For example, in a case where the robot 1 is a human-like robot, the movable part 40 may be exemplified by various parts such as the arms, fingers, legs, neck, head, and face of the robot.

The control section 10 performs overall control of the robot 1. The control section 10 obtains a voice from the microphone 20. On the basis of the voice obtained, the control section 10 performs (i) a process of determining whether or not concurrent occurrence of speech has taken place, (ii) a process related to identification of a speech to be deterred, and (iii) a process of controlling the driving section 30 and the voice output section 50.

More specifically, the control section 10 includes a concurrence determination section (concurrent speech determination section) 11, a deterrence-target identification section 12, and a driving control section 13. The concurrence determination section 11 determines whether or not concurrent occurrence of speech has taken place. The concurrence determination section 11 analyzes, one by one, voices obtained by the control section 10 from the microphone 20, so as to determine whether or not overlap between a plurality of speech voices is currently taking place. Note that "speech voice" refers to a voice generated when a user or a robot speaks, not a sound such as ambient sound. In a case where a plurality of speech voices are overlapping with each other, the concurrence determination section 11 determines that concurrent occurrence of speech has taken place. In a case where the concurrence determination section 11 determines that concurrent occurrence of speech has taken place, the concurrence determination section 11 notifies the deterrence-target identification section 12 that the concurrent occurrence of speech has taken place. Hereinafter, unless otherwise specified, descriptions will be given on the assumption that concurrent occurrence occurs between the robot and a user or between two users. Note however that the concurrence determination section 11 may make a determination similarly to the above-described determination also in a case where concurrent occurrence of speech has taken place between the robot 1 and two or more users, or between three or more users.

In a case where concurrent occurrence of speech has taken place, the deterrence-target identification section 12 identifies one or more speech voices to be deterred from among a plurality of speech voices which are causing the concurrent occurrence of speech. In other words, the deterrence-target identification section 12 identifies one or more users to whom a deterrence motion, which will be described later, is to be shown. In a case where the deterrence-target identification section 12 is informed by the concurrence determination section 11 that concurrent occurrence of speech has taken place, the deterrence-target identification section 12 compares a voice(s) before the concurrent occurrence of speech and voices after the concurrent occurrence of speech so as to identify, as a speech voice to be deterred, a speech voice of a party who started speaking later than the other(s) did. Note that in a case where concurrent occurrence of speech has taken place between three or more parties including the robot 1 and users, the deterrence-target identification section 12 identifies, as a speech voice to be deterred, a speech voice of a party who started speaking last.

The deterrence-target identification section 12 further determines whether or not the speech voice to be deterred is a speech voice of a user or a speech voice of the robot 1 itself. For example, the deterrence-target identification section 12 compares a voice which the voice output control section 14 caused the voice output section 50 to output and a speech voice to be deterred, and determines that the speech voice to be deterred is a speech voice of a user in a case where a degree to which these voices match is less than a predetermined value, and determines that the speech voice to be deterred is a speech voice of the robot 1 in a case where the degree is not less than the predetermined value.

In a case where the speech voice to be deterred is a speech voice of a user, the deterrence-target identification section 12 instructs the driving control section 13 to perform control related to a deterrence motion. In a case where the speech voice to be deterred is a speech voice of the robot 1 itself, the deterrence-target identification section 12 may transmit, to the voice output control section 14, an instruction to stop voice output, or may end the process without transmitting the instruction to other members.

The driving control section 13 controls the driving section 30 so as to cause the movable part 40 of the robot 1 to make a deterrence motion. Once the driving control section 13 receives an instruction from the deterrence-target identification section 12 to perform control related to a deterrence motion, the driving control section 13 drives the driving section 30 so that the movable part 40 makes the deterrence motion.

The voice output control section 14 controls speech of the robot 1 by controlling voice output of the voice output section 50. In a case where the voice output control section 14 has received an instruction from the deterrence-target identification section 12 to stop voice output, the voice output control section 14 causes the voice output section 50 to stop voice output.

<<Flow of Process of Robot 1>>

Lastly, the following description will discuss a flow of processes carried out by the control section 10. FIG. 3 is a flowchart showing a flow of processes of the control section 10. Note that the flowchart of FIG. 3 shows a flow of processes carried out in accordance with a single determination made by the concurrence determination section 11 regarding concurrent occurrence of speech. In reality, since the microphone 20 inputs voices one by one to the control section 10, determination of whether or not concurrent occurrence of speech is taking place is made by the concurrence determination section 11 each time. The processes shown in FIG. 3 are repeated while the control section 10 obtains voices from the microphone 20.

In a case where the control section 10 receives a voice(s), the concurrence determination section 11 analyzes the voice (s) so as to determine whether or not overlap between a plurality of speech voices is taking place (Si 1; concurrent speech determination step). In a case where overlap between a plurality of speech voices is taking place (YES at S11), the concurrence determination section 11 determines that concurrent occurrence of speech has taken place (S12; concurrent speech determination step), and notifies the deterrence-target identification section 12 of the determination. In a case where no overlap between a plurality of speech voices is taking place (NO at S11), the sections of the control section 10 do not perform subsequent processes.

In a case where the deterrence-target identification section 12 is notified from the concurrence determination section 11 that concurrent occurrence of speech has taken place, the deterrence-target identification section 12 identifies, as a speech voice to be deterred, a voice of a party who started speaking last among speech voices which caused the concurrent occurrence of speech (S13).

The deterrence-target identification section 12 further determines whether or not the speech voice to be deterred is a speech voice of a user or a speech voice of the robot 1 (S14). In a case where the speech voice to be deterred is a speech voice of a user (YES at S14), the deterrence-target identification section 12 gives an instruction to the driving control section 13 to perform control related to a deterrence motion. In a case where the speech voice to be deterred is not a speech voice of a user but is a speech voice of the robot 1 (NO at S14), the sections of the control section 10 do not perform subsequent processes.

Once the driving control section 13 receives the instruction from the deterrence-target identification section 12, the driving control section 13 controls the driving of the driving section 30 so as to cause the movable part 40 to move so that the robot 1 makes a deterrence motion (S15; driving control step).

According to the above processes, in a case where concurrent occurrence of speech takes place, the robot 1 can make a deterrence motion so as to urge a user to stop speaking. As such, even in a case where the user is in a state where it is difficult for the user to hear a voice, it is possible to let the user know that the user should stop speaking. Further, even in a case where the user is not paying attention to the robot, the deterrence motion is likely to catch the user's eyes as long as the robot is within the user's field of view. Accordingly, it is possible to urge a user, in a manner more easily recognizable to the user, to stop speaking.

Further, as compared with a case in which a voice is used to urge a user to stop speaking, an absence of overlap between a user's speech and a sound (warning sound etc.) for urging the user to stop speaking makes it possible to let the user know more easily that the user should stop speaking.

Note that in a case where concurrent occurrence of speech is solved (in a case of NO at S11 in FIG. 3), the driving control section 13 may stop controlling the driving section 30 immediately, or may, until causing the movable part 40 to make a series of motions indicative of the deterrence motion, continue controlling the driving section 30 in order to continue the deterrence motion. Further, the driving control section 13 may cause the movable part 40 to repeat a deterrence motion while concurrent occurrence of speech continues (while a determination YES continues to be made at S11 in FIG. 3). Alternatively, in a case where a series of motions (e.g., swinging an arm left and right twice) constituting a single deterrence motion is ended, the driving control section 13 may suspend repeating a deterrence motion until concurrent occurrence of speech is solved.

This is for the following reason. For example, in a case where a user wants to talk about something important, the user is likely to continue speaking even when the robot 1 urges the user to stop speaking. In such a case, since it has been communicated to the user that (i) concurrent occurrence of speech has taken place and (ii) the user is supposed to stop speaking, it is not necessary to continue the deterrence motion.

Embodiment 2

The following description will discuss Embodiment 2 of the present invention. For easy explanation, the same reference signs will be given to members having the same function as a member described in Embodiment 1, and descriptions on such a member will be omitted. This also applies to subsequent Embodiments.

A robot (robot 2) in accordance with Embodiment 2 differs from the robot 1 in accordance with Embodiment 1 in that the robot 2 (i) identifies a user who has outputted a speech voice to be deterred and (ii) makes a deterrence motion toward a direction where the user is present as viewed from the robot 2.

Figure 4:
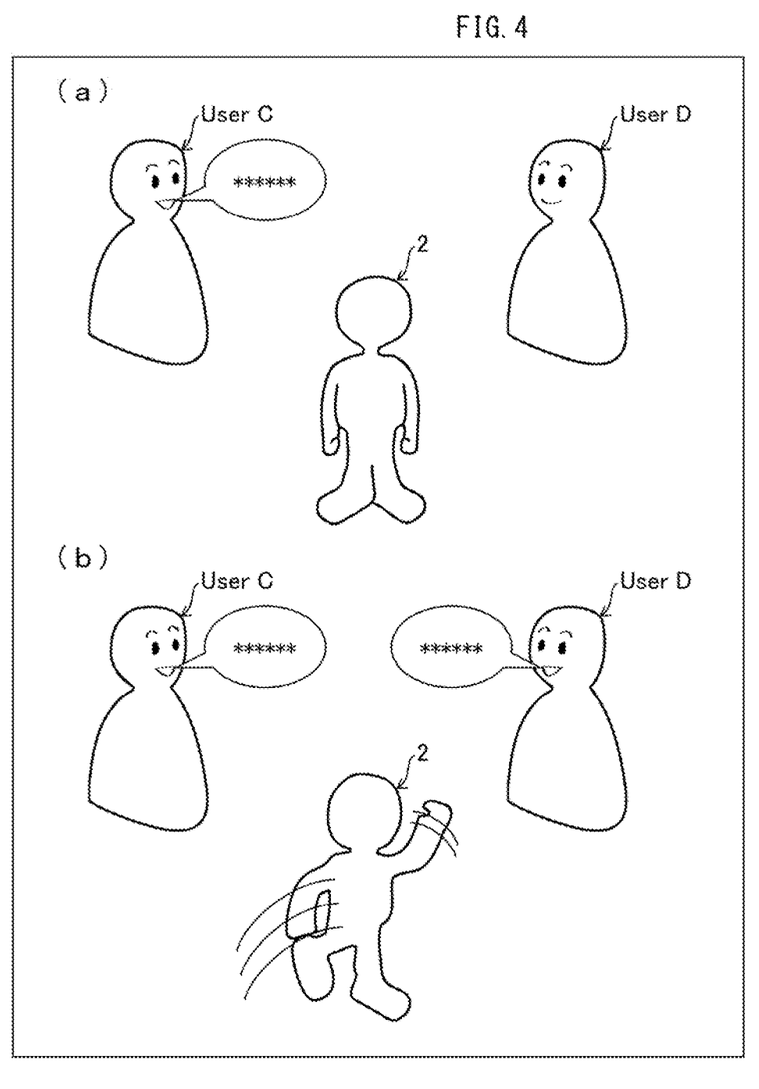
FIG. 4 is views schematically illustrating a motion of a robot in accordance with Embodiment 2 of the present invention.

(a) and (b) of FIG. 4 are views schematically illustrating a motion of the robot 2 in accordance with Embodiment 2. As illustrated in (a) of FIG. 4, in a case where a user D starts speaking while another user C is speaking, concurrent occurrence of the user C's speech and the user D's speech arises. In a case where concurrent occurrence of speech takes place, the robot 2 identifies, as illustrated in (b) of FIG. 2, the user who has started talking after the other did, and makes a deterrence motion toward the user thus identified.

Figure 5:
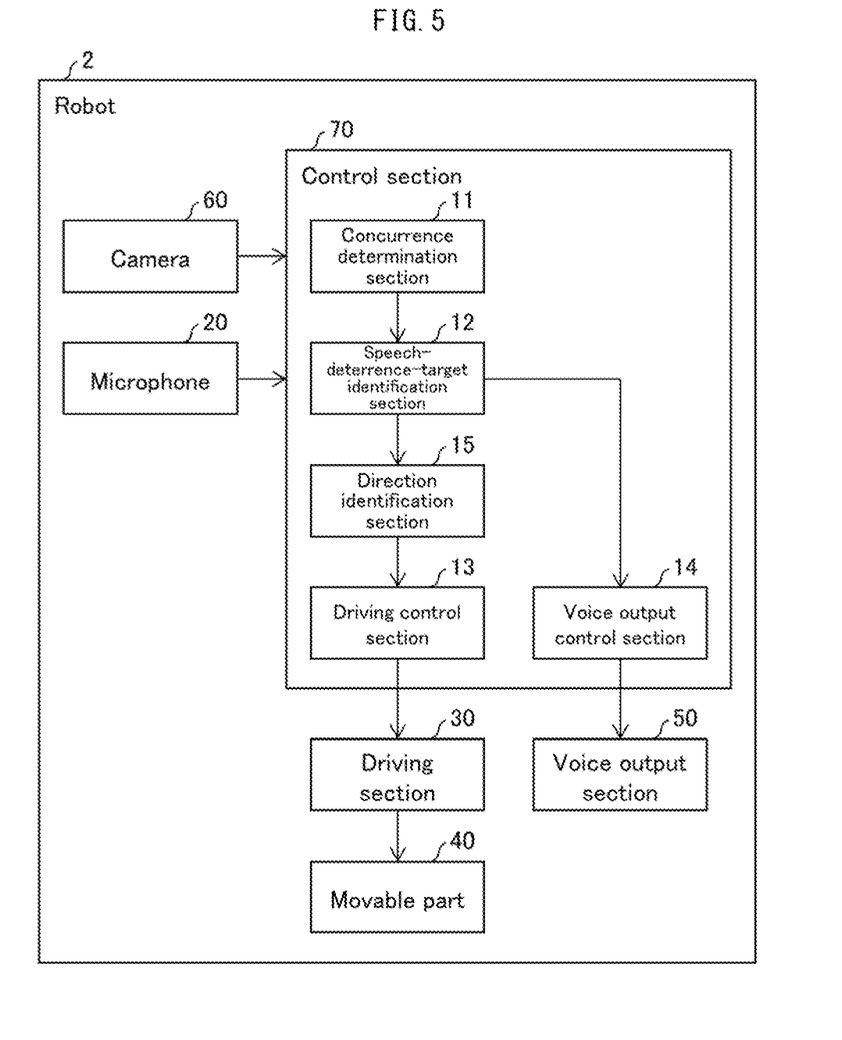
FIG. 5 is a block diagram illustrating a configuration of main parts of the robot.

FIG. 5 is a block diagram illustrating a configuration of main parts of the robot 2. The robot 2 differs from the robot 1 in that the robot 2 includes (i) a control section (control device, voice obtaining section, image obtaining section) 70 including a direction identification section (direction identification section, orientation identification section) 15 and (ii) a camera 60.

The camera 60 captures an image of a surrounding of the robot 2 one by one, and transmits the image thus captured to the control section 70. Note that the camera 60 may capture a still image at regular intervals and transmit the still image to the control section 70 or may film a moving image and transmit the moving image one by one to the control section 70.

In a case where a deterrence-target identification section 12 of the control section 70 determines that a speech voice to be deterred is a voice of a user, the deterrence-target identification section 12 instructs the direction identification section 15 to identify a direction where the user is present. On the basis of the voice and the image, the direction identification section 15 identifies a direction in which the user (target user) who has uttered the speech voice to be deterred is present as viewed from the robot 2. The direction identification section 15 transmits, to a driving control section 13, information indicative of the direction where the target user is present.

Once the driving control section 13 receives, from the direction identification section 15, the information indicative of the direction where the target user is present, the driving control section 13 controls a driving section 30 so that the robot 2 makes a deterrence motion while facing the direction.

Figure 6:
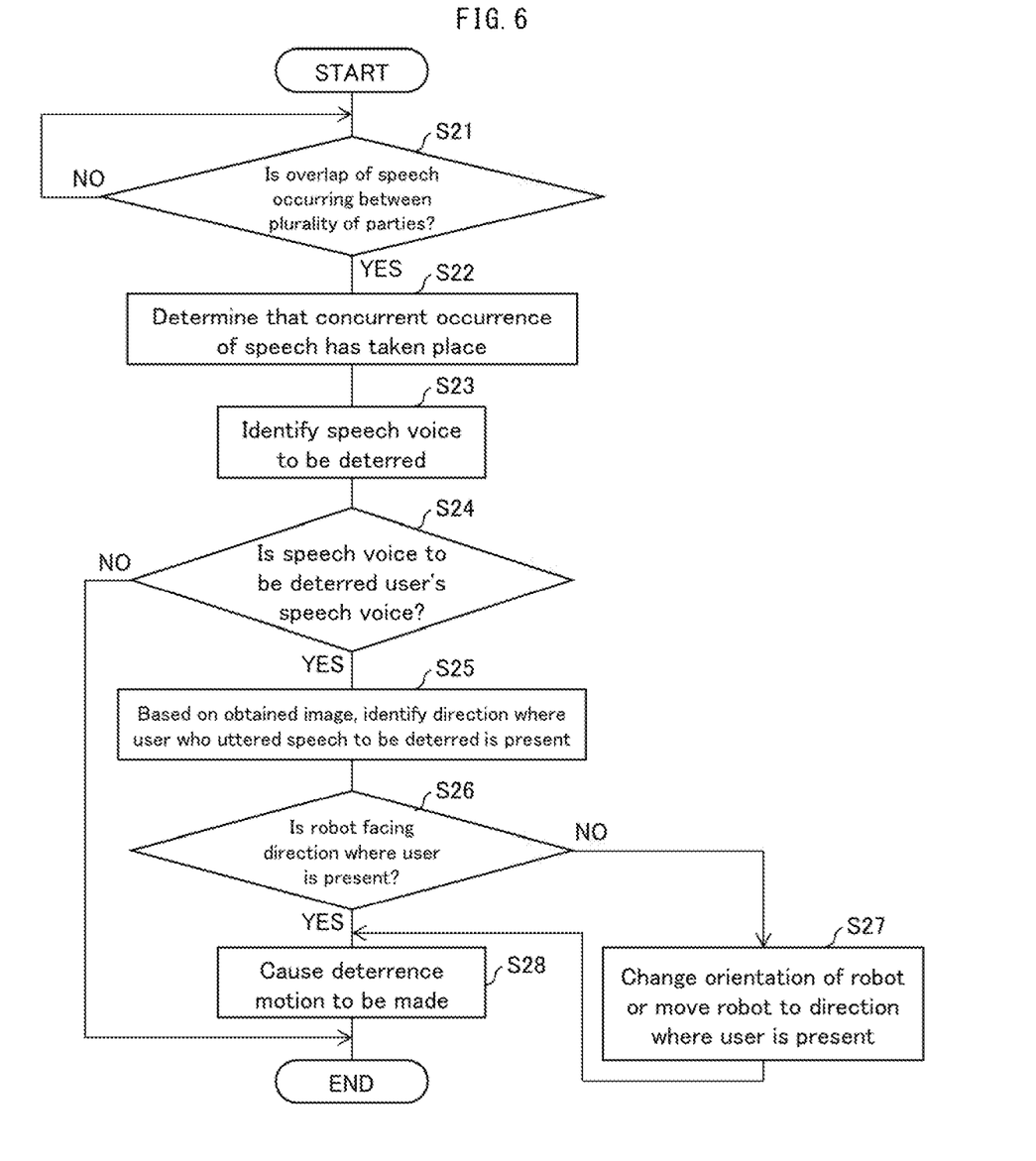
FIG. 6 is a flowchart showing a flow of processes carried out by a control section of the robot.

FIG. 6 is a flowchart showing a flow of processes carried out by the control section 70 in accordance with Embodiment 2. Note that processes at S21 through S24 are the same as the processes at S11 through S14 in FIG. 3. In a case where the deterrence-target identification section 12 determines that a speech voice to be deterred is a speech voice of a user (YES at S24), the direction identification section 15 identifies, from an image which the control section 70 obtained from the camera 60, a direction where the target user is present (S25).

Then, the driving control section 13 determines whether or not the robot 2 is currently facing the direction where the target user is present (S26). In a case the robot 2 is facing the direction where the target user is present (YES at S26), the driving control section 13 controls the driving section 30 so as to cause the robot 2 to make a deterrence motion (S28). In a case where the robot 2 is not facing the direction where the target user is present (NO at S26), the driving control section 13 controls the driving section 30 so as to change an orientation of the robot 2 (posture of the robot 2) to a direction where the target user is present, or move the robot 2 itself in the direction where the target user is present (S27). Once changing the orientation of the robot 2 or moving the robot 2 is completed, the driving control section 13 controls the driving section 30 so as to cause the robot 2 to make a deterrence motion (S28).

According to the above processes, the control section 70 can cause the robot 2 to make a deterrence motion toward a direction where a user who is to be deterred from speaking is present. This allows showing a deterrence motion to a user in a manner more easily recognizable to the user.

Embodiment 3

The following description will discuss Embodiment 3 of the present invention. A robot 2 in accordance with Embodiment 3 differs from the robots in accordance with Embodiments 1 and 2 in that a direction identification section 15 identifies an orientation of a face of a target user together with a direction where the target user is present. Further, the robot 2 in accordance with Embodiment 3 differs from the robots in accordance with Embodiments 1 and 2 in that a driving control section 13 controls a driving section 30 such that the robot 2 makes a deterrence motion only after a posture of the robot 2 is changed or the robot 2 is moved so that the robot 2 enters a field of view of the target user.

Figure 7:
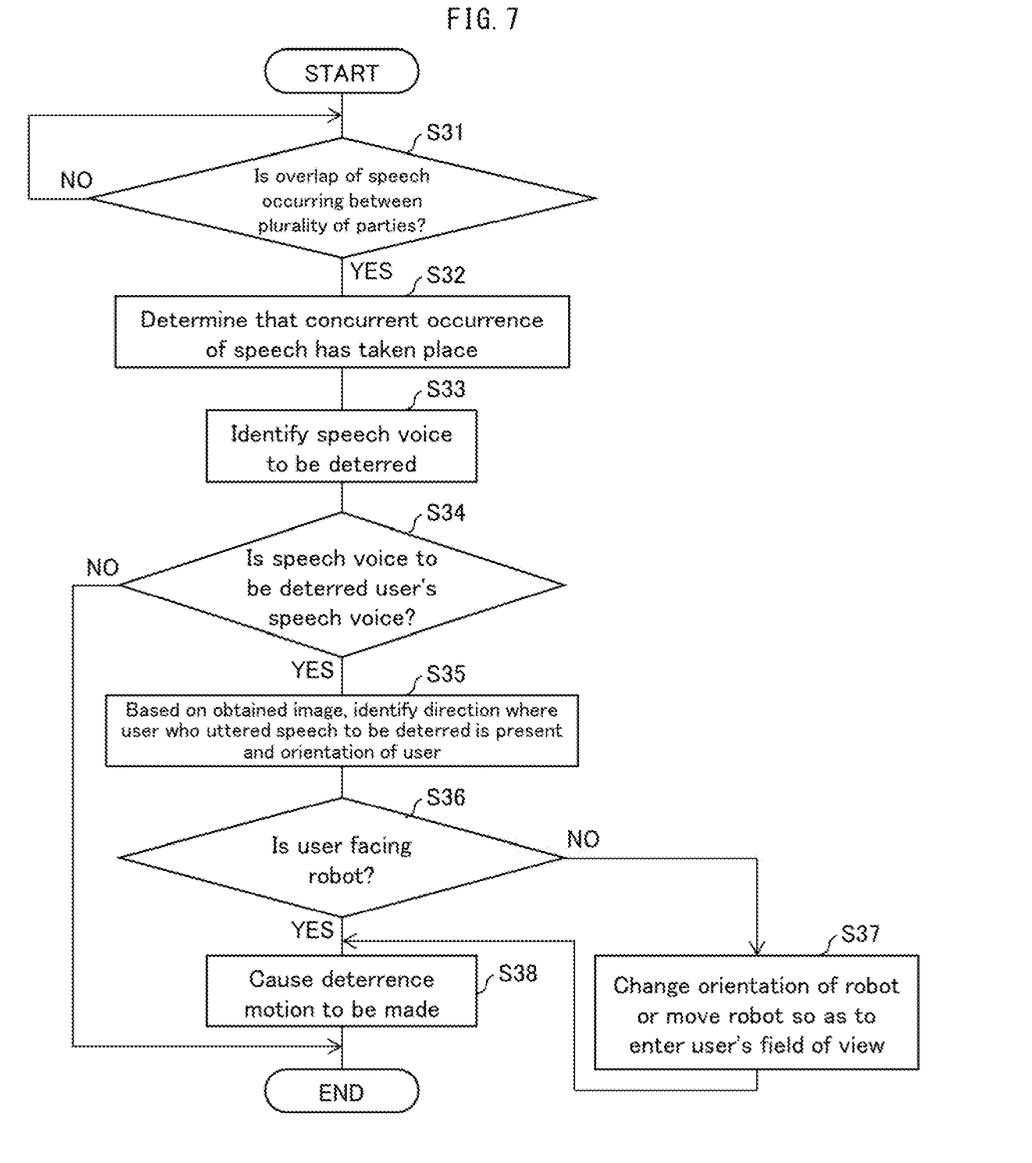
FIG. 7 is a flowchart showing a flow of processes carried out by a control section of a robot in accordance with Embodiment 3 of the present invention.

FIG. 7 is a flowchart showing a flow of processes carried out by a control section 70 in accordance with Embodiment 3. Note that processes at S31 through S34 are the same as the processes at S11 through S14 in FIG. 3. In a case where a deterrence-target identification section 12 determines that a speech voice to be deterred is a speech voice of a user (YES at S34), the direction identification section 15 identifies, on the basis of an image obtained by the control section 70 from the camera 60, (i) a direction where the target user is present and (ii) an orientation of the target user (S35). The orientation of the target user means a direction which a face of the target user faces.

On the basis of a current orientation of the robot 2 and the orientation of the target user, the driving control section 13 determines whether or not the target user is looking toward the robot 2 (S36). In a case where the target user is facing the robot 2 (YES at S36), the driving control section 13 controls the driving section 30 so as to cause the robot 2 to make a deterrence motion (S38). For example, assuming that a direction which the face of the target user is facing is 0°, the driving control section 13 identifies a space, which extends within a predetermined angle from the angle 0° on the left hand side and the right hand side each and within a predetermined distance from the target user, to be a space that is within a field of view of the target user. Then, in a case where the robot 2 is within this space, the driving control section 13 can determine that the target user is facing the robot 2.

In a case where the target user is not facing the robot 2 (NO at S36), the driving control section 13 controls the driving section 30 so as to change the orientation of the robot 2 (posture of the robot 2) or to move the robot 2 itself so that the robot 2 enters the field of view of the target user (S37). Once changing the orientation of the robot 2 or moving the robot 2 is completed, the driving control section 13 controls the driving section 30 so as to cause the robot 2 to make a deterrence motion (S38).

According to the above processes, the control section 70 can cause the robot 2 to make a deterrence motion (i) toward a direction where a user to be deterred from speaking is present and (ii) in a state where the robot 2 is within a field of view of the user. This allows the user to recognize the deterrent motion even in a case where the user is not facing the robot 2.

Embodiment 41

The robot 2 may include a directional microphone as the microphone 20, instead of including the camera 60. Further, the control section 70 of the robot 2 may obtain voices around the robot 2 via the directional microphone.

In such a case, on the basis of the voices, the direction identification section 15 of the control section 70 identifies a direction where a target user is present as viewed from the robot 2. For example, the direction identification section 15 may identify the direction where the target user is present on the basis of a volume, directivity, and the like of each speech voice included in the voices. Then, the driving control section 13 controls the driving section 30 so that the robot 2 makes a deterrence motion while facing the direction identified by the direction identification section 15.

According to the above configuration, even without the camera 60, it is possible to identify a direction where a user is present, on the basis of voices inputted to the control section 70 through the directional microphone. Further, elimination of the camera 60 allows the robot 2 to be realized in a simpler configuration using a smaller number of components.

Modified Example

The robot 2 described in Embodiment 3 above may be configured such that the direction identification section 15 identifies a position of a face of a target user on the basis of an image. Then, the driving control section 13 may cause the robot 2 to make a deterrence motion in accordance with the position of the face of the target user. For example, the robot 2 can be caused to make, as the deterrence motion, a motion of holding up a hand of the robot 2 so that a palm of the hand faces the face of the target user. It accordingly becomes possible to show a deterrence motion to a user in a manner more easily recognizable to the user.

In Embodiments 1 through 4 above, the control section 10 and the control section 70 are described as being devices which are built in the robot 1 and the robot 2, respectively. However, the control section 10 and the control section 70 may be respectively (i) an external device which is externally connected to the robot 1 or an external device which is connected to the robot 1 via a wired or wireless connection and (ii) an external device which is externally connected to the robot 2 or an external device which is connected to the robot 2 via a wired or wireless connection.

Further, when the control section 10 and the control section 70 described in Embodiments 1 through 4 cause the robot 1 or the robot 2 to make a deterrence motion, the control section 10 and the control section 70 may cause the robot 1 or the robot 2 to output a sound effect or a voice in combination with the deterrence motion. In such a case, for example, the driving control section 13 may provide the voice output control section 14 with an instruction to output a sound effect or a voice corresponding to a deterrence motion, and the voice output control section 14 may control the voice output section 50 in accordance with the instruction.

Further, the robot 1 and the robot 2 may each include a light or a display device. When the control section 10 and the control section 70 cause the robot 1 or the robot 2 to make a deterrence motion, the control section 10 and the control section 70 may cause the robot 1 or the robot 2 to emit light from the light or perform image display on the display device, in combination with the deterrence motion. In such a case, for example, the driving control section 13 may make a decision to cause light corresponding to the deterrence motion to be turned on and off or to cause an image corresponding to the deterrence motion to be outputted, and the control section 10 or the control section 70 may control the display device in accordance with the decision. Further, all of (i) a deterrence motion, (ii) the above-described speech deterrence with use of a sound effect or a voice, and (iii) the above-described speech deterrence with use of light from a light or image display may be combined in order to notify a user that the user should stop speaking.

By thus appropriately combining a sound, an image, light, and motions of the robot 1 and the robot 2 themselves to notify a user to stop speaking, it becomes easier for the user to recognize the notification.

[Software Implementation Example]

Control blocks of the control section 10 and the control section 70 (particularly, the concurrence determination section 11, the deterrence-target identification section 12, the driving control section 13, the voice output control section 14, and the direction identification section 15) may be realized by a logic circuit (hardware) provided in an integrated circuit (IC chip) or the like or may be realized by software.

In the latter case, the control section 10 and the control section 70 each include a computer that executes instructions of a program that is software realizing the foregoing functions. The computer, for example, includes at least one processor (control device) and at least one computer-readable storage medium storing the program. The object of the present invention can be achieved by the processer of the computer reading and executing the program stored in the storage medium. The processor may be, for example, a CPU (Central Processing Unit). The storage medium may be "a non-transitory tangible medium" such as a ROM (Read Only Memory), a tape, a disk, a card, a semiconductor memory, and a programmable logic circuit. The computer may further include a RAM (Random Access Memory) or the like that develops the program in executable form. Further, the program may be supplied to or made available to the computer via any transmission medium (such as a communication network and a broadcast wave) which enables transmission of the program. Note that one aspect of the present invention can also be implemented by the program in the form of a computer data signal embedded in a carrier wave which is embodied by electronic transmission.

[Recap]

A control device (control sections 10 and 70) in accordance with Aspect 1 of the present invention is a control device for controlling a robot (1 and 2) which includes at least one movable part (40) driven by a driving section (30), the control device including: a voice obtaining section (control sections 10 and 70) configured to obtain a voice around the robot; a concurrent speech determination section (concurrence determination section 11) configured to determine, on the basis of the voice, whether or not concurrent occurrence of speech has taken place between the robot and a user or between a plurality of users; and a driving control section (13) configured to, in a case where the concurrent speech determination section determines that the concurrent occurrence of speech has taken place, control the driving section so as to cause the at least one movable part of the robot to make a deterrence motion which is a motion for urging a user among the user or the plurality of users to stop speaking.

A control method in accordance with Aspect 7 of the present invention is a control method to be carried out by a control device (control sections 10 and 70) for controlling a robot (1 and 2) which includes at least one movable part (40) driven by a driving section (30), the control method including: a voice obtaining step of obtaining a voice around the robot; a concurrent speech determination step (S11 through S12) of determining, on the basis of the voice, whether or not concurrent occurrence of speech has taken place between the robot and a user or between a plurality of users; and a driving control step (S15) of, in a case where it was determined in the concurrent speech determination step that the concurrent occurrence of speech has taken place, controlling the driving section so as to cause the at least one movable part of the robot to make a deterrence motion which is a motion for urging a user among the user or the plurality of users to stop speaking.

According to the above configuration or processes, in a case where concurrent occurrence of speech takes place, it is possible to cause the robot to make a deterrence motion so as to urge a user to stop speaking. As such, even in a case where the user is in a state where it is difficult for the user to hear a voice, it is possible to let the user know that the user should stop speaking. Further, even in a case where the user is not paying attention to the robot, the deterrence motion is likely to catch the user's eyes as long as the robot is within the user's field of view. Thus, the above configuration allows urging a user, in a manner more easily recognizable to the user, to stop speaking.

In Aspect 2 of the present invention, the control device in accordance with Aspect 1 may be configured such that the control device further includes a deterrence-target identification section (12) configured to, in a case where the concurrent speech determination section determines that the concurrent occurrence of speech has taken place, identifies, as a speech voice to be deterred, a speech voice which started being uttered last among a plurality of speech voices included in the voice, the driving control section causing the robot to make the deterrence motion in a case where the speech voice to be deterred is a speech voice of any of the user or the plurality of users.

According to the above configuration, the control device makes a deterrence motion in a case where (i) concurrent occurrence of speech has taken place and (ii) a speech voice to be deterred accordingly is a speech voice uttered from a user. In other words, the above configuration allows causing the control device to make no deterrence motion, for example, in a case where a speech voice to be deterred is a voice uttered by the robot to be controlled. This allows a deterrence motion to be made only in a case where the deterrence motion is necessary.

In Aspect 3 of the present invention, the control device in accordance with Aspect 2 may be configured such that: the robot is a robot which is capable of changing an orientation of the robot by causing one or more of the at least one movable part to make a motion; the control device further includes: an image obtaining section (control sections 10 and 70) configured to obtain an image around the robot; and a direction identification section (15) configured to identify, on the basis of the image and the voice, a direction, as viewed from the robot, of a user who has uttered the speech voice to be deterred; and the driving control section controls the driving section so that the robot makes the deterrence motion while facing the direction identified by the direction identification section.

According to the above configuration, the control device can cause the robot to make a deterrence motion toward a direction where a user who is to be deterred from speaking is present. This allows showing a deterrence motion to a user in a manner more easily recognizable to the user.

In Aspect 4 of the present invention, the control device in accordance with Aspect 3 may be configured such that the control device further includes an orientation identification section (direction identification section 15) configured to identify, on the basis of the image, an orientation of a face of a target user who has uttered the speech voice to be deterred, the driving control section controlling the driving section so as to (i) change a posture of the robot or move the robot in accordance with the orientation of the face of the target user and (ii) cause the robot to make the deterrence motion.

According to the above configuration, the control device can cause the robot to make a deterrence motion (i) toward a direction where a user to be deterred from speaking is present and (ii) in a state where the robot is within a field of view of the user. This allows the user to recognize the deterrent motion even in a case where the user is not facing the robot.

In Aspect 5 of the present invention, the control device in accordance with Aspect 2 may be configured such that: the voice obtaining section obtains the voice from a directional microphone; the control device further includes a direction identification section (15) configured to identify, on the basis of the voice, a direction, as viewed from the robot, of a user who has uttered the speech voice to be deterred; and the driving control section controls the driving section so that the robot makes the deterrence motion while facing the direction identified by the direction identification section.

According to the configuration, without obtaining an image of a camera or the like, it is possible to identify, on the basis of a voice inputted to the voice obtaining section through the directional microphone, a direction where a user is present. This allows the robot to be realized in a simpler configuration using a smaller number of components.

A robot (1 and 2) in accordance with Aspect 6 of the present invention is a robot including: a control device (control section 10 or 70) recited in any one of Aspects 1 through 5; a microphone (20) configured to input, to the voice obtaining section, a voice around the robot; and a driving section (30) configured to drive the movable part under control of the driving control section. The above configuration brings about effects similar to those of Aspect 1.

The control device according to the foregoing embodiments of the present invention may be realized by a computer. In this case, the present invention encompasses: a control program for the control device which program causes a computer to operate as the foregoing sections of the control device so that the control device can be realized by the computer; and a computer-readable storage medium storing the control program therein.

The present invention is not limited to the embodiments, but can be altered by a skilled person in the art within the scope of the claims. The present invention also encompasses, in its technical scope, any embodiment derived by combining technical means disclosed in differing embodiments. Further, it is possible to form a new technical feature by combining the technical means disclosed in the respective embodiments.

REFERENCE SIGNS LIST 1, 2: robot
10, 70: control section (control device, voice obtaining section, image obtaining section)
11: concurrence determination section (concurrent speech determination section)
12: deterrence-target identification section
13: driving control section
14: voice output control section
15: direction identification section (direction identification section, orientation identification section)
20: microphone
30: driving section
40: movable part
50: voice output section
60: camera

The invention claimed is:

1. A control device for controlling a robot which includes at least one movable part driven by a driving section, the control device comprising:

a voice obtaining section configured to obtain a voice around the robot;

an image obtaining section configured to obtain an image around the robot;

a direction identification section configured to identify, on the basis of the image and the voice, a direction, as viewed from the robot, of a user who has uttered a speech voice to be deterred;

a concurrent speech determination section configured to determine, on the basis of the voice, whether or not concurrent occurrence of speech has taken place between the robot and a user or between a plurality of users;

a driving control section configured to, in a case where the concurrent speech determination section determines that the concurrent occurrence of speech has taken place, control the driving section so as to cause the at least one movable part of the robot to make a deterrence motion which is a motion for urging a user among the user or the plurality of users to stop speaking; and a deterrence-target identification section configured to, in a case where the concurrent speech determination section determines that the concurrent occurrence of speech has taken place, identifies, as the speech voice to be deterred, a speech voice which started being uttered last among a plurality of speech voices included in the voice, wherein the driving control section causing the robot to make the deterrence motion in a case where the speech voice to be deterred is a speech voice of any of the user or the plurality of users;

the robot is a robot which is capable of changing an orientation of the robot by causing one or more of the at least one movable part to make a motion; and the driving control section controls the driving section so that the robot makes the deterrence motion while facing the direction identified by the direction identification section.

2. The control device as set forth in claim 1, further comprising an orientation identification section configured to identify, on the basis of the image, an orientation of a face of a target user who has uttered the speech voice to be deterred, the driving control section controlling the driving section so as to (i) change a posture of the robot or move the robot in accordance with the orientation of the face of the target user and (ii) cause the robot to make the deterrence motion.

3. A control device for controlling a robot which includes at least one movable part driven by a driving section, the control device comprising:

a voice obtaining section configured to obtain a voice around the robot;

a concurrent speech determination section configured to determine, on the basis of the voice, whether or not concurrent occurrence of speech has taken place between the robot and a user or between a plurality of users;

a driving control section configured to, in a case where the concurrent speech determination section determines that the concurrent occurrence of speech has taken place, control the driving section so as to cause the at least one movable part of the robot to make a deterrence motion which is a motion for urging a user among the user or the plurality of users to stop speaking;

a deterrence-target identification section configured to, in a case where the concurrent speech determination section determines that the concurrent occurrence of speech has taken place, identifies, as the speech voice to be deterred, a speech voice which started being uttered last among a plurality of speech voices included in the voice; and the driving control section causing the robot to make the deterrence motion in a case where the speech voice to be deterred is a speech voice of any of the user or the plurality of users, wherein the voice obtaining section obtains the voice from a directional microphone;

the control device further comprises a direction identification section configured to identify, on the basis of the voice, a direction, as viewed from the robot, of a user who has uttered the speech voice to be deterred; and the driving control section controls the driving section so that the robot makes the deterrence motion while facing the direction identified by the direction identification section.

4. A robot comprising:

a control device recited in claim 1;

a microphone configured to input, to the voice obtaining section, the voice around the robot; and the driving section configured to drive the movable part under control of the driving control section.

5. A control method to be carried out by a control device for controlling a robot which includes at least one movable part driven by a driving section, the control method comprising:

a voice obtaining step of obtaining a voice around the robot;

an image obtaining step of obtaining an image around the robot;

a direction identification step of identifying, on the basis of the image and the voice, a direction, as viewed from the robot, of a user who has uttered a speech voice to be deterred;

a concurrent speech determination step of determining, on the basis of the voice, whether or not concurrent occurrence of speech has taken place between the robot and a user or between a plurality of users;

a driving control step of, in a case where it was determined in the concurrent speech determination step that the concurrent occurrence of speech has taken place, controlling the driving section so as to cause the at least one movable part of the robot to make a deterrence motion which is a motion for urging a user among the user or the plurality of users to stop speaking, and a deterrence-target identification step of, in a case where the concurrent speech determination section determines that the concurrent occurrence of speech has taken place, identifies, as the speech voice to be deterred, a speech voice which started being uttered last among a plurality of speech voices included in the voice, wherein the driving control step causing the robot to make the deterrence motion in a case where the speech voice to be deterred is a speech voice of any of the user or the plurality of users, the robot is a robot which is capable of changing an orientation of the robot by causing one or more of the at least one movable part to make a motion, and the driving control step controls the driving section so that the robot makes the deterrence motion while facing the direction identified by the direction identification section.

6. A non-transitory computer-readable storage medium that stores a control program for causing a computer to function as a control device recited in claim 1, the control program being configured to cause the computer to function as the voice obtaining section, the concurrent speech determination section, and the driving control section.

\* \* \* \* \*